United States Patent
Park

(10) Patent No.: US 7,848,324 B2
(45) Date of Patent: Dec. 7, 2010

(54) INTERNET GROUP MEMBERSHIP PROTOCOL NETWORK DEVICE AND SIGNAL PROCESSING CONTROL METHOD THEREOF IN IP DIGITAL BROADCASTING SYSTEM

(75) Inventor: Hyun-Ah Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 763 days.

(21) Appl. No.: 11/640,840

(22) Filed: Dec. 19, 2006

(65) Prior Publication Data

US 2007/0165634 A1 Jul. 19, 2007

(30) Foreign Application Priority Data

Jan. 17, 2006 (KR) ...................... 10-2006-0005102

(51) Int. Cl.
*H04L 12/28* (2006.01)
*H04J 3/26* (2006.01)

(52) U.S. Cl. ........................................ 370/390; 370/432

(58) Field of Classification Search ........................ None
See application file for complete search history.

(56) References Cited

U.S. PATENT DOCUMENTS

| 7,072,343 B1* | 7/2006 | Waclawsky et al. .... 370/395.21 |
| 2005/0041680 A1 | 2/2005 | Tanaka et al. |
| 2005/0163146 A1* | 7/2005 | Ota et al. .................... 370/432 |
| 2006/0168341 A1* | 7/2006 | Keller-Tuberg ............. 709/242 |
| 2007/0058629 A1* | 3/2007 | Luft ........................... 370/390 |

FOREIGN PATENT DOCUMENTS

| JP | 2004-064649 | 2/2004 |
| JP | 2004-214964 | 7/2004 |
| JP | 2005-065045 | 3/2005 |
| KR | 10-2006-0060237 | 6/2006 |

OTHER PUBLICATIONS

Japanese Office action issued by the Japanese Patent Office on Aug. 25, 2009 in the corresponding Japanese Patent application No. 2007-007552 with English translation attached.

* cited by examiner

*Primary Examiner*—Salman Ahmed
*Assistant Examiner*—Sori A Aga
(74) *Attorney, Agent, or Firm*—H.C. Park & Associates, PLC

(57) ABSTRACT

An Internet group membership protocol (IGMP) network device and a signal processing control method thereof in an Internet protocol (IP) digital broadcasting system are provided. The method includes: when an IGMP packet is received from an IGMP client, determining, at a packet transmission/reception unit, whether or not the received IGMP packet is transmitted via bypass; when it is determined that the IGMP packet received from the IGMP client is transmitted via bypass, copying, at the packet transmission/reception unit, the received IGMP packet and bypass-transmitting an original IGMP packet to an upper IGMP network device; transmitting, at the packet transmission/reception unit, the copied IGMP packet to a host; and receiving, at the host, the IGMP packet from the packet transmission/reception unit, processing the IGMP packet, and simultaneously updating its multicast table and a multicast table of the packet transmission/reception unit.

20 Claims, 8 Drawing Sheets

INTERNET GROUP MEMBERSHIP PROTOCOL NETWORK DEVICE AND SIGNAL PROCESSING CONTROL METHOD THEREOF IN IP DIGITAL BROADCASTING SYSTEM

CLAIM OF PRIORITY

This application makes reference to, incorporates the same herein, and claims all benefits accruing under 35 U.S.C. §119 from an application for INTERNET GROUP MEMBERSHIP PROTOCOL NETWORK DEVICE AND SIGNAL PROCESS CONTROL METHOD IN DIGITAL BROADCASTING SYSTEM THEREOF earlier filed in the Korean Intellectual Property Office on Jan. 17, 2006 and there duly assigned Serial No. 10-2006-0005102.

BACKGROUND OF THE INVENTION

1. Field of the Invention

The present invention relates to an Internet group membership protocol (IGMP) network device and a signal processing control method thereof in an Internet protocol (IP) digital broadcasting system.

2. Description of the Related Art

In general, an Internet protocol television, i.e., an IP TV provides information service, moving picture content, and broadcasting on television using ultra-high speed Internet. The IP TV is a type of digital convergence based on a combination of Internet and television, and is different from a conventional Internet TV in that a television receiver is substituted for a computer monitor and a remote controller is substituted for a mouse.

To use the IP TV, a television receiver, a set-top box, and Internet can be connected. In other words, the IP TV can be used when the set-top box or a dedicated modem is added to the television and power is applied as the television turns on. Accordingly, though not familiar to a computer, a user can be provided with various Internet providing contents such as movie viewing, home shopping, home banking, online game, MP3, and additional services thereof as well as Internet search using a remote controller.

The IP TV does not have a great difference from general cable broadcasting or satellite broadcasting in that it provides broadcasting content including video, but has a great feature in bidirectionality. Unlike general sky wave broadcasting, cable broadcasting, or satellite broadcasting, a viewer can view only his/her program desired at his/her convenient time. Accordingly, the initiative of TV broadcasting is given to the viewer from a broadcasting company or a relay company. At present, the IP TV service is being provided in some countries such as Hong Kong, Italy, and Japan, but is at an initial stage all over the world. In the interior, communication service providers are actively providing the IP TV to have an economic effect of scopes using a given infrastructure to the maximum.

An IP TV system includes at least one IGMP client including a TV receiver and an IP set-top box, and network devices allowing the IGMP clients to receive the IP TV service over the Internet. The network device is composed of a host (CPU) for processing an IGMP request of the IGMP client (subscriber); and a packet transmission/reception unit connected to the IGMP client over the Internet and connected to an upper IGMP network device to take charge of a data transmission/reception function. Each of the host and the packet transmission/reception unit has a multicast table for storing channel information (group IP or group media access control (MAC)) and IGMP client information on a channel-by-channel basis, creates/modifies/deletes the multicast table as a result of processing an IGMP packet and, if necessary, creates a proper IGMP packet and transmits the created IGMP packet to the upper IGMP network device.

In the IGMP network device, the IGMP processing is wholly dependent on the host and therefore, the IGMP network device provides a plan for reducing the number of IGMP packets transmitted to the upper IGMP network device. In other words, it is a method in which a necessary one of the IGMP packets received from the IGMP client or only an IGMP message created by the host is transmitted to the upper IGMP network device, thereby reducing host load of the upper IGMP network device. This function is called "report suppression". The IGMP network device has provided the function only on the basis of processing by the host.

A signal processing procedure of the conventional IGMP network device of the IP TV system providing the above function will be described below. In order to watch a predetermined channel (Ch 10), the IGMP client transmits an IGMP membership report ("report") message to the packet transmission/reception unit of the IGMP network device. After that, the packet transmission/reception unit of the IGMP network device transmits the received IGMP report message to the host. Then, the host determines whether or not a channel requested by the IGMP client using the IGMP report message is registered in the multicast table.

When it is determined that the channel requested by the IGMP client is not registered in the multicast table, the host registers the channel requested by the IGMP client and the IGMP client information in the multicast table. The host also updates the multicast table of the packet transmission/reception unit to correspond to a change of the host.

After that, the host transmits the IGMP report message to the upper IGMP network device through the packet transmission/reception unit. The host can transmit the IGMP report message received from the IGMP client without any change, or transmit the received IGMP report message after modification.

Upon receipt of the IGMP report message requesting a predetermined channel from a lower IGMP network device, the upper IGMP network device determines whether or not a channel associated with the IGMP report message is received from an IP broadcasting station.

When it is determined that the channel requested using the IGMP report message is received from the IP broadcasting station, the upper IGMP network device copies and transmits an IP TV broadcasting stream of the requested channel to a packet transmission/reception unit of the lower IGMP network device. Otherwise, the upper IGMP network device is associated with a multicast routing protocol such as protocol independent multicast (PIM) and then receives a corresponding IP TV broadcasting stream, or again transmits the IGMP message to its upper network device to request an IP TV broadcasting stream and then transmits it to the packet transmission/reception unit of the lower IGMP network device.

If so, the packet transmission/reception unit of the lower IGMP network device transmits the IP TV broadcasting stream of the channel that is requested by the IGMP client transmitting the IGMP report message.

Meanwhile, when the channel requested by the IGMP client is registered in the multicast table of the packet transmission/reception unit, and the IGMP client is also registered on the channel, the host updates the IGMP client information to the channel registered in the multicast table and terminates.

However, when the channel requested by the IGMP client is registered in the multicast table of the packet transmission/ reception unit and the IGMP client is not registered on the channel, the host adds the IGMP client information to the channel registered in the multicast table, and allows the added IGMP client information to be reflected in the packet transmission/reception unit. After that, the IP TV stream of the channel is copied and transmitted even to the IGMP client.

In the conventional IP TV system, the IGMP client generates the IGMP packets to watch the TV, and transmits the generated IGMP packets to the network device receiving the IP TV stream, through at least one IGMP network device. Not only when the channel changes but also in order to keep watching one channel, the IGMP client periodically generates the IGMP packets. Therefore, as the IGMP clients connected to an IP TV network increase in number, the whole generated IGMP packets also increase in number.

Since the IGMP packets generated to choose a TV channel by the IGMP clients are processed in the host of the IGMP network device, the hosts of the respective network devices are delayed due to the processing and this results in an increase of a standby time for channel change of the IGMP client.

SUMMARY OF THE INVENTION

It is an objective of the present invention to provide an IGMP network device and a signal processing control method thereof in an IP digital broadcasting system, in which a conventional report suppression function of IGMP snooping provided through a host is processed not in the host but in a packet transmission/reception unit for transmitting/receiving packets, thereby reducing load of the host and a response time to a channel request of an IGMP client.

It is another objective of the present invention to provide an IGMP network device and a signal processing control method thereof in an IP digital broadcasting system, in which, when a currently not used channel is released using a query, only a query response of a client initially performing a query response among clients using a channel is processed and query responses received from other clients are not processed, thereby reducing network load caused by processing all query responses.

It is yet another objective of the present invention to provide a network device and technique thereof, decreasing load and increasing response upon change of channel in an efficient and economic manner and with ease of implementation.

A first aspect of the present invention provides a signal processing control method of an Internet group membership protocol (IGMP) network device in an Internet protocol (IP) digital broadcasting system. The method includes the steps of: when an IGMP packet is received from an IGMP client, determining, at a packet transmission/reception unit, whether or not the received IGMP packet is transmitted via bypass; when it is determined that the IGMP packet received from the IGMP client is transmitted via bypass, copying, at the packet transmission/reception unit, the received IGMP packet and bypass-transmitting an original IGMP packet to an upper IGMP network device; transmitting, at the packet transmission/reception unit, the copied IGMP packet to a host; and receiving, at the host, the IGMP packet from the packet transmission/reception unit, processing the IGMP packet, and simultaneously updating its multicast table and a multicast table of the packet transmission/reception unit.

The method may further include the steps of: when it is determined that the IGMP packet received from the IGMP client is not transmitted via bypass, transmitting, at the packet transmission/reception unit, the IGMP packet received from the IGMP client to the host; and receiving, at the host, the IGMP packet from the packet transmission/reception unit, processing the IGMP packet, updating its multicast table, and, if necessary, updating the multicast table of the packet transmission/reception unit.

The step of determining whether or not the received IGMP packet is transmitted via bypass at the packet transmission/reception unit may include the steps of: determining, at the packet transmission/reception unit, whether or not the IGMP packet received from the IGMP client is an IGMP report message for a channel request; when it is determined that the IGMP packet received from the IGMP client is the IGMP report message, checking, at the packet transmission/reception unit, the multicast table, and determining whether or not a channel requested for registration through the IGMP report message is registered in the multicast table; and when it is determined that the channel requested for registration through the IGMP report message is not registered in the multicast table, bypass-transmitting the received IGMP packet.

The method may further include the step of: when it is determined that the IGMP packet received from the IGMP client is an IGMP leave message, checking, at the packet transmission/reception unit, the multicast table and determining whether or not a channel requested for release through the IGMP leave message is registered in the multicast table.

A second aspect of the present invention provides an Internet group membership protocol (IGMP) network device in an Internet protocol (IP) digital broadcasting system. The device includes: a packet transmission/reception unit for, upon receipt of an IGMP packet from an IGMP client, determining whether or not the IGMP packet is transmitted via bypass, copying the received IGMP packet and transmitting the copied IGMP packet to an upper IGMP network device and a host when it is determined that the IGMP packet is transmitted via bypass, and transmitting the received IGMP packet to the host when it is determined that the IGMP packet is not transmitted via bypass; and the host for receiving the IGMP packet from the packet transmission/reception unit, processing the IGMP packet, updating its multicast table, and, if necessary, updating a multicast table of the packet transmission/reception unit.

The multicast table of the packet transmission/reception unit may manage channel information (group IP or group MAC) and IGMP client information, and an IP TV stream may be copied on the basis of the table.

When the IGMP packet received from the IGMP client is an IGMP report message for channel registration, only when the channel requested through the IGMP report message is not registered in the multicast table, the packet transmission/reception unit may determine to bypass-transmit the IGMP packet. When the IGMP packet received from the IGMP client is an IGMP leave message for channel release, when only the IGMP client requested for release is registered on a channel of the multicast table, the packet transmission/reception unit may determine to bypass-transmit the IGMP packet.

A third aspect of the present invention provides a signal processing control method of an Internet group membership protocol (IGMP) network device in an Internet protocol (IP) digital broadcasting system. The method includes the steps of: when an IGMP query is received from an upper IGMP network device, transmitting, at a packet transmission/reception unit, the signal processing IGMP query to all IGMP clients, respectively, and receiving an IGMP response report from each of the IGMP clients as a response to the IGMP query; bypass-transmitting, at the packet transmission/reception unit, only a first received IGMP response report to an upper IGMP network device; transmitting, at the packet transmission/reception unit, the IGMP response report received from each of the IGMP clients to the host; and updating, at the host, its multicast table through the IGMP response report received from the packet transmission/reception unit.

In the step of bypass-transmitting only the first received IGMP response report to the upper IGMP network device at the packet transmission/reception unit, the packet transmission/reception unit may check a specific field/bit for indicating whether or not the IGMP response report of the multicast table is forbidden to be transmitted, and determine whether or not bypass-transmission to the upper IGMP network device is performed. When the specific field or bit of the table is not set, the packet transmission/reception unit may bypass-transmit the first received IGMP response report to the upper IGMP network device.

In the step of bypass-transmitting only the first received IGMP response report to the upper IGMP network device at the packet transmission/reception unit, when the specific field/bit of the table is set, the packet transmission/reception unit may transmit the IGMP response report to the host without bypass-transmitting it to the upper IGMP network device.

In the step of, at the host, updating its multicast table through the IGMP response report received from the packet transmission/reception unit, when the IGMP response report is not received from the IGMP client for a critical time, the host may release the IGMP client registered in its multicast table and the multicast table of the packet transmission/reception unit.

A fourth aspect of the present invention provides an Internet group membership protocol (IGMP) network device in an Internet protocol (IP) digital broadcasting system. The device includes: when an IGMP response report which is a response to an IGMP query received from an upper IGMP network device is received from an IGMP client, a packet transmission/reception unit for bypass-transmitting only a first IGMP response report to the upper IGMP network device, and transmitting the received IGMP response report to a host; and the host for receiving the IGMP response report from the packet transmission/reception unit, processing the IGMP response report, and updating its multicast table.

The packet transmission/reception unit may include a multicast table having at least one of channel information (group IP and group MAC), IGMP client information (Port number or permanent virtual circuit (PVC) information), and a field/bit for determining whether or not the IGMP response report is received.

When the IGMP response report is not received from the IGMP client for a critical time, the host may release the IGMP client registered in its multicast table and the multicast table of the packet transmission/reception unit.

A fifth aspect of the present invention provides a signal processing control method of an Internet group membership protocol (IGMP) network device in an Internet protocol (IP) digital broadcasting system. The method includes the steps of: transmitting, at a packet transmission/reception unit, an IGMP query generated from a host to all IGMP clients, and receiving an IGMP response report as a response to the IGMP query from each of the IGMP clients; transmitting, at the packet transmission/reception unit, the IGMP response report received form each of the IGMP clients to the host; and updating, at the host, its multicast table through the IGMP response report received from the packet transmission/reception unit.

In the step of updating, at the host, its multicast table through the IGMP response report received from the packet transmission/reception unit, when the IGMP response report is not received from the IGMP client for a critical time, the host may release the IGMP client registered in its multicast table and the multicast table of the packet transmission/reception unit.

A sixth aspect of the present invention provides an Internet group membership protocol (IGMP) network device in an Internet protocol (IP) digital broadcasting system. The device includes: a packet transmission/reception unit for transmitting an IGMP query generated from a host to all IGMP clients, and then, upon receipt of an IGMP response report to the IGMP query from the IGMP client, transmitting the IGMP response report to the host; and the host for receiving the IGMP response report from the packet transmission/reception unit, processing the IGMP response report, updating its multicast table, and, if necessary, updating a multicast table of the packet transmission/reception unit.

The multicast table of the packet transmission/reception unit may include at least one of a group IP and a group MAC indicating a supply channel, information on an IGMP client currently being provided with the supply channel, and a field/bit for determining whether or not the IGMP response report is received.

When the IGMP response report is not received from the IGMP client for a critical time, the host may release the IGMP client registered in its multicast table and the multicast table of the packet transmission/reception unit.

BRIEF DESCRIPTION OF THE DRAWINGS

A more complete appreciation of the present invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF EXEMPLARY EMBODIMENTS

Hereinafter, exemplary embodiments of the present invention will be described in detail with reference to the accompanying drawings. In the following description, a detailed description of known functions and configurations incorporated herein has been omitted for conciseness.

Figure 1:
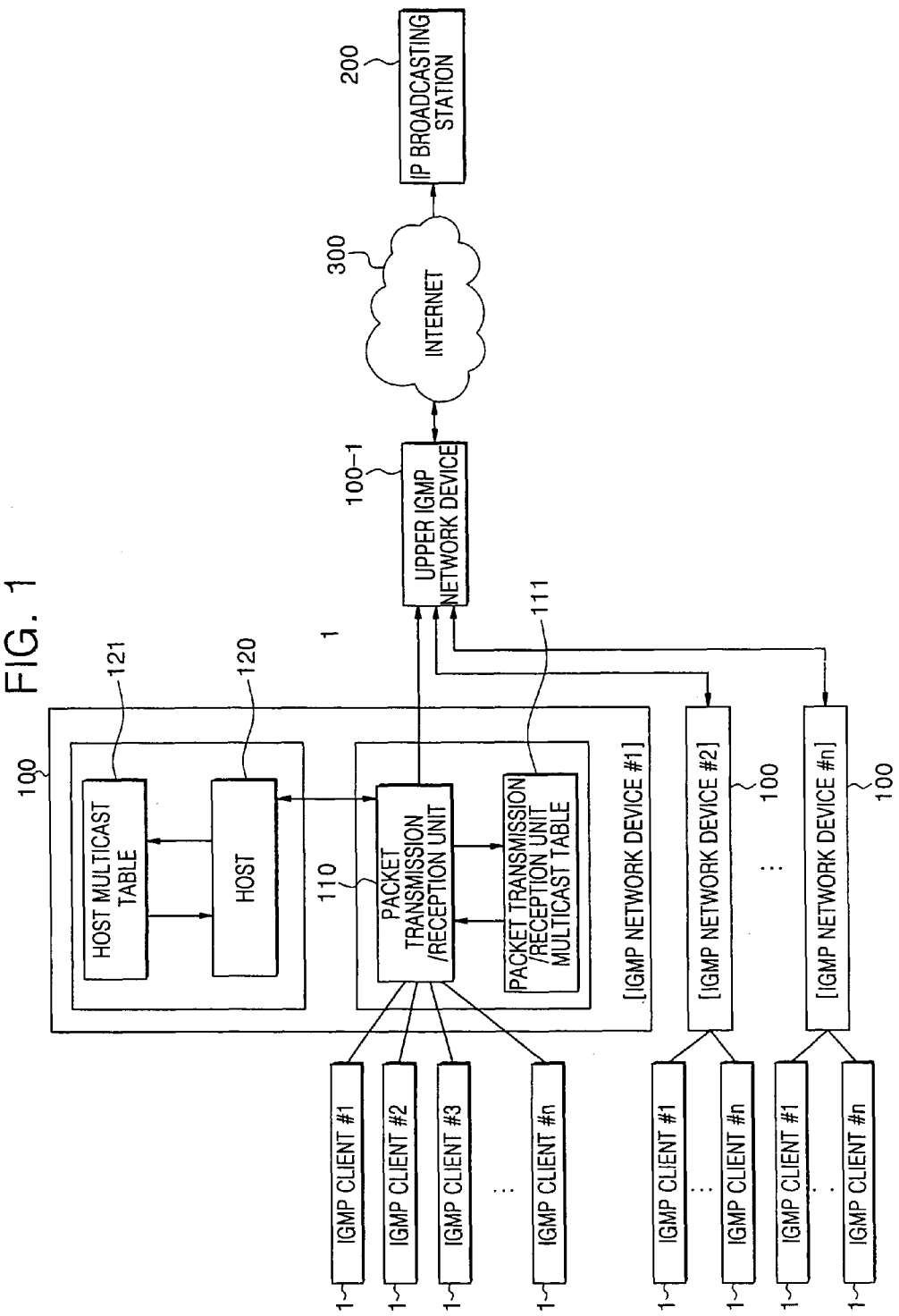
FIG. 1 illustrates the construction of an IP TV system according to the present invention.

FIG. 1 illustrates the construction of an Internet protocol television (IP TV) system according to the present invention.

Upon receipt of an IGMP packet form an IGMP client 1-1, the packet transmission/reception unit 110 determines whether or not the IGMP packet is transmitted via bypass. When it is determined that the IGMP packet is transmitted via bypass, the packet transmission/reception unit 110 copies the received IGMP packet and then transmits the result to an upper IGMP network device 100-1 and the host 120, respectively. On the other hand, when it is determined that the IGMP packet is not transmitted via bypass, the packet transmission/reception unit 110 transmits the received IGMP packet to the host 120. The packet transmission/reception unit 110 includes the transmission/reception unit multicast table 111 including a group IP or a group media access control (MAC) and information on the IGMP client 1-1. If the IGMP packet received from the IGMP client 1-1 is an IGMP report message for channel registration, only when there is no channel information of the transmission/reception unit multicast table 111, the packet transmission/reception unit 110 determines to bypass-transmit the IGMP packet. If the JUMP packet received from the IGMP client 1-1 is an IGMP leave message for channel release, only when any IGMP client information other than information of the IGMP client 1-1 is not registered on the channel of the transmission/reception unit multicast table 111, the packet transmission/reception unit 110 determines to bypass-transmit the IGMP packet and performs bypass-transmission to the upper IGMP network device 100-1. In the specification and the claims, both "bypass" and "bypass-transmitting" refer to a process in which an IGMP packet received from an IGMP client is directly transmitted from a packet transmission/reception unit included in an IGMP network device to an upper IGMP network device without passing through a host included in the IGMP network device.

The host 120 receives the IGMP packet from the packet transmission/reception unit 110 and then, processes the received IGMP packet, updates the host multicast table 121 and, if necessary, updates the transmission/reception unit multicast table 111.

The transmission/reception unit multicast table 111 includes the channel (group IP or group MAC) and the information on the IGMP client 1-1.

Figure 2:
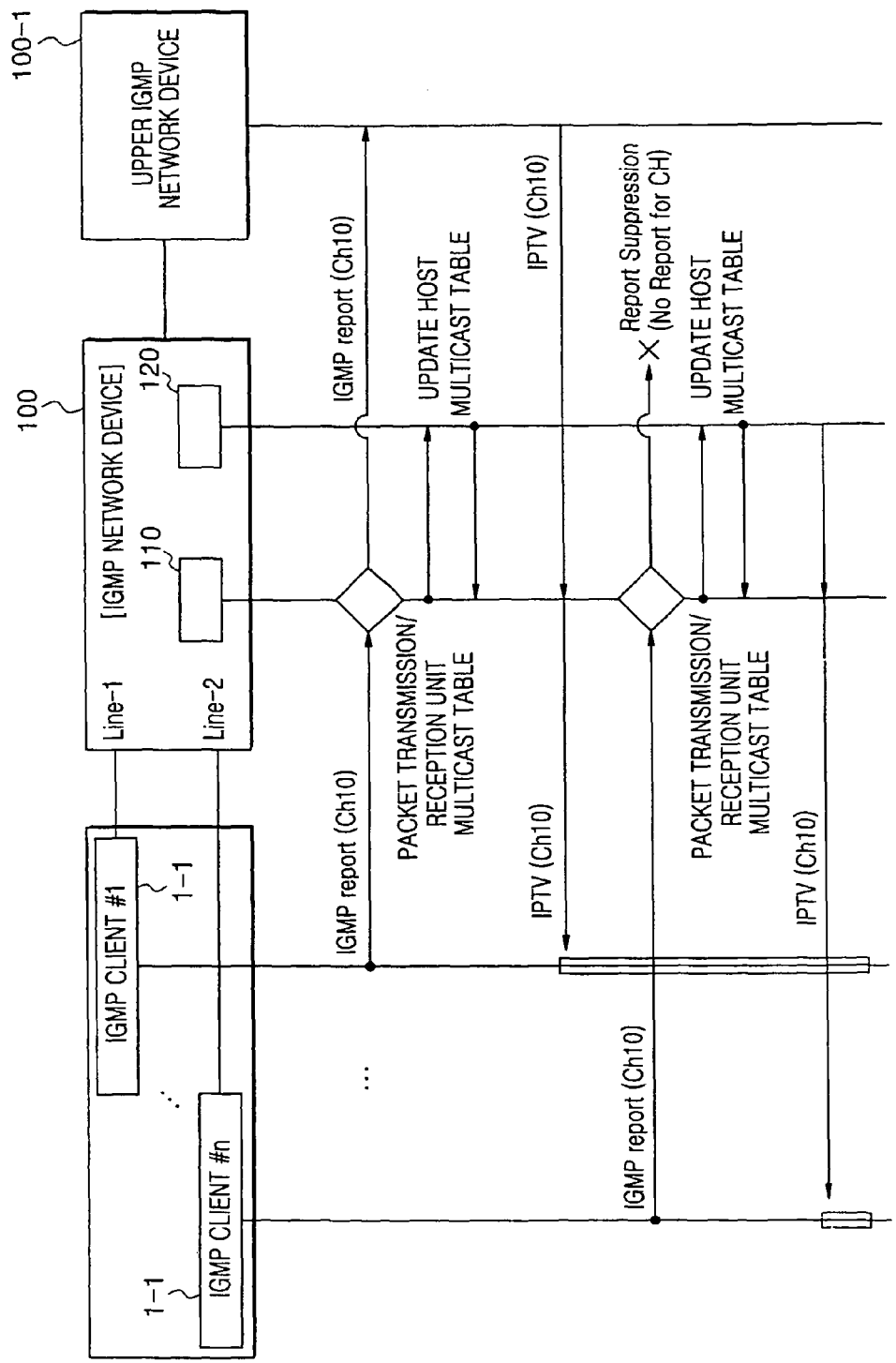
FIG. 2 is a reference view illustrating a signal flow of an IGMP network device in an IP digital broadcasting system according to a first exemplary embodiment of the present invention.

In a general function and a detailed operation of each of the constituent elements, a description for signal processing thereof will be omitted, and a description for an operation related to the present invention will be made with reference to FIG. 2.

First, a predetermined IGMP client 1-1 transmits an IGMP report message (including a channel "10", and MAC information of the IGMP client) to a packet transmission/reception unit 110 of an IGMP network device 100. Here, the IGMP report message transmitted from the IGMP client 1-1 includes channel information (group IP and group MAC) requested by the IGMP client 1-1, and IGMP client information.

The packet transmission/reception unit 110 of the IGMP network device 100 checks a transmission/reception multicast table 111 which is managed by the packet transmission/reception unit 110. The multicast table 111 is assumed as shown in Table 1.

TABLE 1

| Channel Information | IGMP client (port) information |
| --- | --- |
| Ch 1 | Port 2, Port 3 |
| Ch 2 | Port 4, Port 5 |

As in Table 1, when a request channel (Ch 10) included in the IGMP report message is not registered as in the transmission/reception unit multicast table 111, the packet transmission/reception unit 110 copies the IGMP report message received from the IGMP client 1-1, and transmits the result to an upper IGMP network device 100-1 or an IP broadcasting station 200.

The packet transmission/reception unit 110 transmits all the received IGMP report messages to the host 120. At this time, the packet transmission/reception (transmission or reception or both transmission and reception) unit 110 transmits the copied IGMP report message without any change, or processes and then transmits proper variable values to the host 120.

Then, the host 120 processes the received IGMP report message, and updates the channel (Ch 10) and the IGMP client 1-1 information (Port 1) to the host multicast table 121 and the transmission/reception unit multicast table 111 as shown in Table 2.

TABLE 2

| Channel information | IGMP client (port) information |
| --- | --- |
| Ch 1 | Port 2, Port 3 |
| Ch 2 | Port 4, Port 5 |
| Ch 10 | Port 1 |

After that, the upper IGMP network device 100-1 or the IP broadcasting station 200 which receives the IGMP report message (channel "10" and MAC of the IGMP client) transmits an IP TV broadcasting stream of the channel (Ch 10) corresponding to the IGMP report message to the packet transmission/reception unit 110 of the IGMP network device 100.

Then, the packet transmission/reception unit 110 of the IGMP network device 100 transmits the received IP TV broadcasting stream of the channel (Ch 10) to the IGMP client 1-1.

Accordingly, a subscriber of the IGMP client 1-1 can watch the channel (Ch 10).

Meanwhile, when the request channel (Ch 10) included in the IGMP report message received from the IGMP client 1-1, and information (Port 7) on other IGMP clients 1-1 watching the request channel (Ch 10) are previously registered in the transmission/reception unit multicast table 111 as shown in Table 3, the packet transmission/reception unit 110 transmits the IGMP report message received from the IGMP client 1-1 to the host 120. At this time, the host 120 does not transmit the IGMP report message to the upper IGMP network device 100-1.

TABLE 3

| Channel information | IGMP client (port) information |
|---|---|
| Ch 1 | Port 2, Port 3 |
| Ch 2 | Port 4, Port 5 |
| Ch 10 | Port 7 |
| Ch 11 | Port 6 |

If so, the host 120 updates the host multicast table 121 and the transmission/reception unit multicast table 111 as shown in Table 4 to correspond to the IGMP report message received from the IGMP client 1-1.

TABLE 4

| Channel information | IGMP client (port) information |
|---|---|
| Ch 1 | Port 2, Port 3 |
| Ch 2 | Port 4, Port 5 |
| Ch 10 | Port 1, Port 7 |
| Ch 11 | Port 6 |

After that, the host 120 copies the IP TV broadcasting stream of the channel (Ch 10) received from the upper IGMP network device 100-1 or the IP broadcasting station 200, and transmits the copied stream to the IGMP client 1-1 of the Port 1.

Accordingly, the subscriber the IGMP client 1-1 can watch the channel (Ch 10).

An operation for allowing the subscriber of the IGMP client 1-1 watching the channel (Ch 10) to watch a channel (Ch 11) will now be described.

Before this, it is assumed that the channel (Ch 10) release-requested by the IGMP client 1-1 for channel change and the information of the IGMP client 1-1 watching the channel (Ch 10) are registered in the transmission/reception unit multicast table 111.

First, the IGMP client 1-1 watching the channel (Ch 10) transmits an IGMP leave message (channel "10" and MAC of the IGMP client) for releasing the channel (Ch 10), to the packet transmission/reception unit 110 of the IGMP network device 100.

Then, the packet transmission/reception unit 110 of the IGMP network device 100 receiving the IGMP leave message (channel "10" and MAC of the IGMP client) checks the transmission/reception unit multicast table 111.

Here, when the channel (Ch 10) and the information on the IGMP client 1-1 watching the channel (Ch 10) are registered in the transmission/reception unit multicast table 111 as shown in Table 4, the packet transmission/reception unit 110 transmits the IGMP leave message to the host 120.

Then, the host 120 releases the IGMP client 1-1 from the channel (Ch 10) of the transmission/reception unit multicast table 111.

Accordingly, the packet transmission/reception unit 110 stops the IP TV stream of the channel (Ch 10) transmitted to the IGMP client 1-1, and the subscriber of the IGMP client 1-1 cannot watch the channel (Ch 10).

When the IGMP client 1-1 registered on the channel has only its own channel (Ch 10) and channel-registered IGMP client 1-1 information as shown in Table 2, the packet transmission/reception unit 110 copies the last IGMP leave message for releasing the channel, and transmits it to the IGMP network device 100 or the IP broadcasting station 200.

Then, the IGMP network device 100 or the IP broadcasting station 200 stop the IP TV stream of the channel (Ch 10) provided to the IGMP network device 100.

After that, the IGMP client 1-1 transmits an IGMP report message (channel "11" and port information "Port 1" of the IGMP client) to the packet transmission/reception unit 110 of the IGMP network device 100.

Then, the packet transmission/reception unit 110 of the IGM network device 100 checks the transmission/reception unit multicast table 111 which is managed by the packet transmission/reception unit 110.

When the request channel (number 11) included in the IGMP report message received from the IGMP client 1-1 is not registered in the transmission/reception unit multicast table 111 as shown in Table 1, the packet transmission/reception unit 110 copies the IGMP report message received from the IGMP client 1-1, and transmits the copied message to the upper IGMP network device 100-1 or the IP broadcasting station 200.

The packet transmission/reception unit 110 transmits all the IGMP report messages to the host 120.

Then, the host 120 processes the received IGMP report message, registers the channel (Ch 10) and the IGMP client information in the host multicast table 121, and then updates as shown in Table 5.

TABLE 5

| Channel information | IGMP client (port) information |
|---|---|
| Ch 1 | Port 2, Port 3 |
| Ch 2 | Port 4, Port 5 |
| Ch 11 | Port 1 |

After that, the upper IGMP network device 100-1 or the IP broadcasting station 200 receiving the IGMP report message (channel "11" and MAC of the IGMP client) transmits the IP TV broadcasting stream of the channel (Ch 11) corresponding to the IGMP report message, to the packet transmission/reception unit 110 of the IGMP network device 100.

Then, the packet transmission/reception unit 110 of the IGMP network device 100 transmits the received IP TV broadcasting stream of the channel (Ch 11) to the channel request IGMP client 1-1.

Accordingly, the subscriber of the IGMP client 1-1 can watch the channel (Ch 11).

Meanwhile, when the request channel included in the received IGMP report message is registered and other IGMP clients 1-1 watching the channel are previously registered in the transmission/reception unit multicast table 111, the packet transmission/reception unit 110 transmits the IGMP report message received from the IGMP client 1-1 to the host 120.

Then, the host 120 updates the transmission/reception unit multicast table 111 to correspond to the received IGMP report message as shown in Table 6.

TABLE 6

| Channel information | IGMP client (port) information |
|---|---|
| Ch 1 | Port 2, Port 3 |
| Ch 2 | Port 4, Port 5 |
| Ch 10 | Port 7 |
| Ch 11 | Port 1, Port 6 |

Subsequently, the host 120 copies the received IP TV broadcasting stream of the channel (Ch 11), and then transmits the copied stream to the IGMP client 1-1.

Accordingly, the subscriber of the IGMP client 1-1 can watch the channel (Ch 11).

Figure 3:
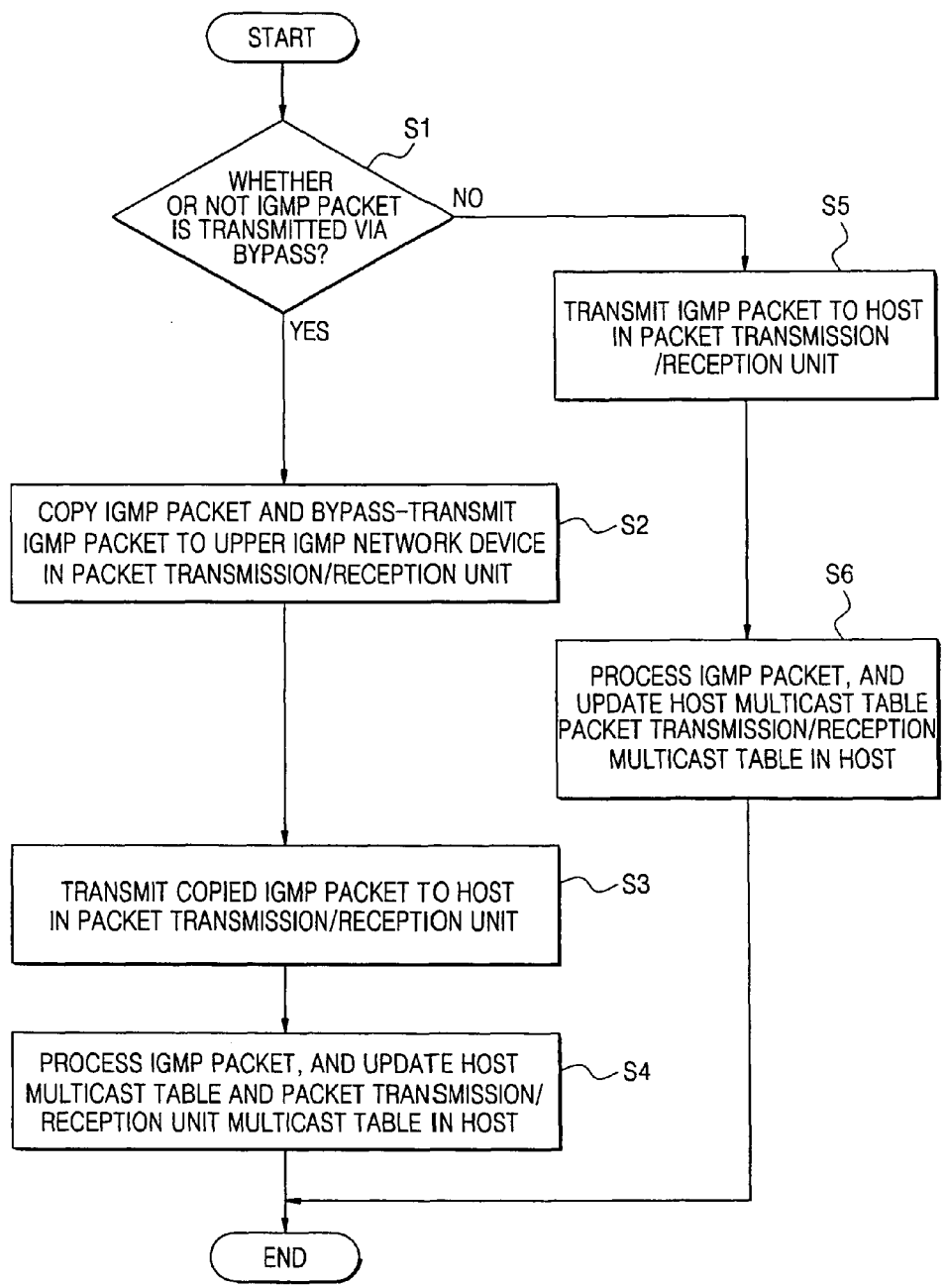
FIG. 3 is a flowchart illustrating a signal processing control method of the IGMP network device in the IP digital broadcasting system according to the first exemplary embodiment of the present invention.

Then, a control method of the IGMP network device 100 in the IP digital broadcasting system according to the present invention will be described with reference to FIG. 3.

First, upon receipt of the IGMP packet from the IGMP client 1-1, the packet transmission/reception unit 110 determines whether or not the received IGMP packet (Step 1) is transmitted via bypass.

Figure 4:
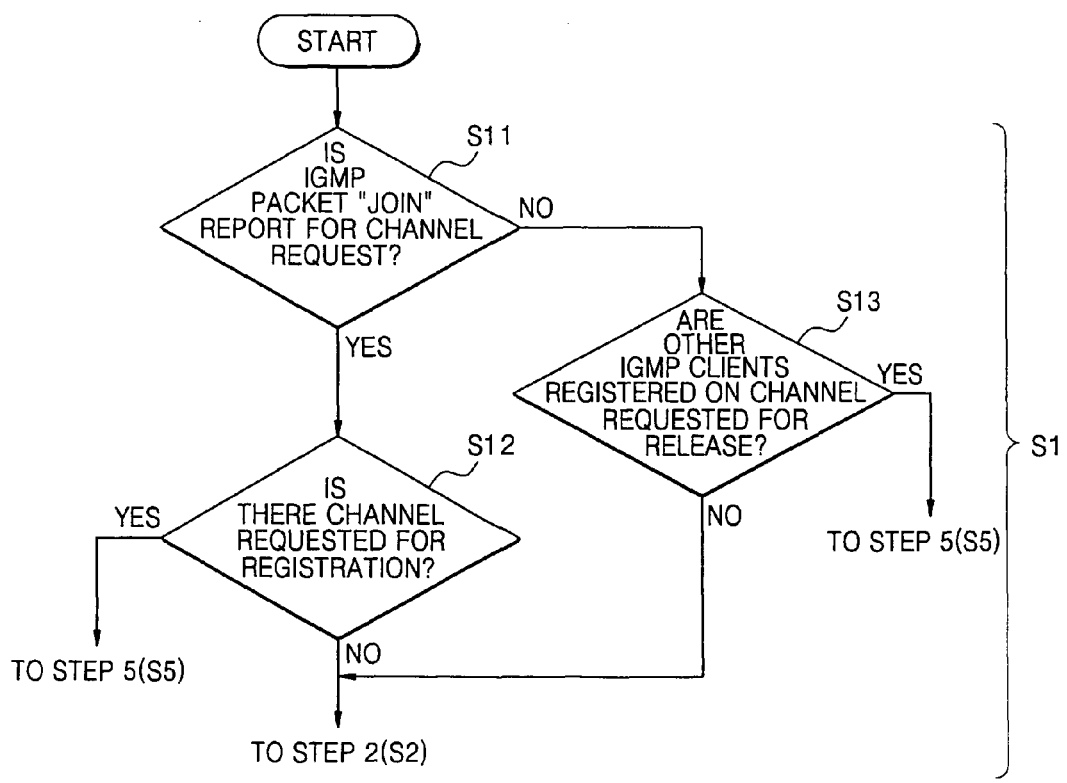
FIG. 4 is a flowchart illustrating a step of determining whether or not an IGMP packet is transmitted via bypass, in the signal processing control method of the IGMP network device in the IP digital broadcasting system of FIG. 3.

A step of determining (Step 1) whether or not the received IGMP packet (join) is transmitted via bypass in the packet transmission/reception unit 110 will now be described with reference to FIG. 4.

First, the packet transmission/reception unit 110 determines whether or not the IGMP packet received from the IGMP client 1-1 is the IGMP report message for channel request (Step 11).

When it is determined in Step 11 that the IGMP packet received from the IGMP client 1-1 is the IGMP report message, the packet transmission/reception unit 110 checks the transmission/reception unit multicast table 111 and determines whether or not the channel requested for channel registration is registered in the multicast table (Step 12).

When it is determined in Step 11 that the IGMP packet received from the IGMP client 1-1 is the IGMP leave message, the packet transmission/reception unit 110 checks the transmission/reception unit multicast table 111 and determines whether or not other IGMP clients 1-1 are registered on the channel requested for release (Step 13).

When it is determined in Step 1 that the IGMP packet received from the IGMP client 1-1 is transmitted via bypass, the packet transmission/reception unit 110 copies the IGMP packet received from the IGMP client, and transmits an original IGMP packet to the upper IGMP network device 100-1 (Step 2).

Subsequently, the packet transmission/reception unit 110 transmits the copied IGMP packet to the host 120 (Step 3).

Then, the host 120 receives the IGMP packet from the packet transmission/reception unit 110, processes the received IGMP packet, updates the host multicast table 121, and updates the transmission/reception unit multicast table 111 if necessary (Step 4).

When it is determined in Step 1 that the IGMP packet is not transmitted via bypass, the packet transmission/reception unit 110 transmits the IGMP packet received from the IGMP client 1-1 to the host 120 (Step 5).

Subsequently, the host 120 receives the IGMP packet from the packet transmission/reception unit 110, processes the IGMP packet, updates the host multicast table 121, and updates the transmission/reception unit multicast table 111 if necessary (Step 6).

After that, the packet transmission/reception unit 110 performs a process corresponding thereto through the updated transmission/reception unit multicast table 111. In other words, the packet transmission/reception unit 110 processes the IGMP report message and the IGMP leave message in the same manner as a conventional art.

The IGMP network device 100 in the IP digital broadcasting system according to a second exemplary embodiment of the present invention includes the packet transmission/reception unit 110 and the host 120, and further includes the respective multicast tables 111 and 121.

When an IGMP response report which is a response to an IGMP query received from the upper IGMP network device 100-1 is received from the IGMP client 1-1, the packet transmission/reception unit 110 transmits only an initial IGMP response report to the upper IGMP network device 100-1 and transmits the received IGMP response report to the host 120. The transmission/reception unit multicast table 111 of the packet transmission/reception unit 110 includes at least one of channel information (group IP and group MAC) indicating a channel, information on an IGMP client (port number or permanent virtual circuit (PVC) information) currently being provided with the supplied channel, and a field/bit (field or bit or both field and bit) for determining whether or not the IGMP response report is received.

The host 120 receives the IGMP response report from the packet transmission/reception unit 110, processes the IGMP response report, updates the host multicast table 121, and updates the transmission/reception unit multicast table 111 if necessary. When the host 120 does not receive the IGMP response report from the IGMP client 1-1 for a critical time, the host 120 releases the IGMP client 1-1 registered in the host multicast table 121 and the transmission/reception unit multicast table 111.

Figure 5:
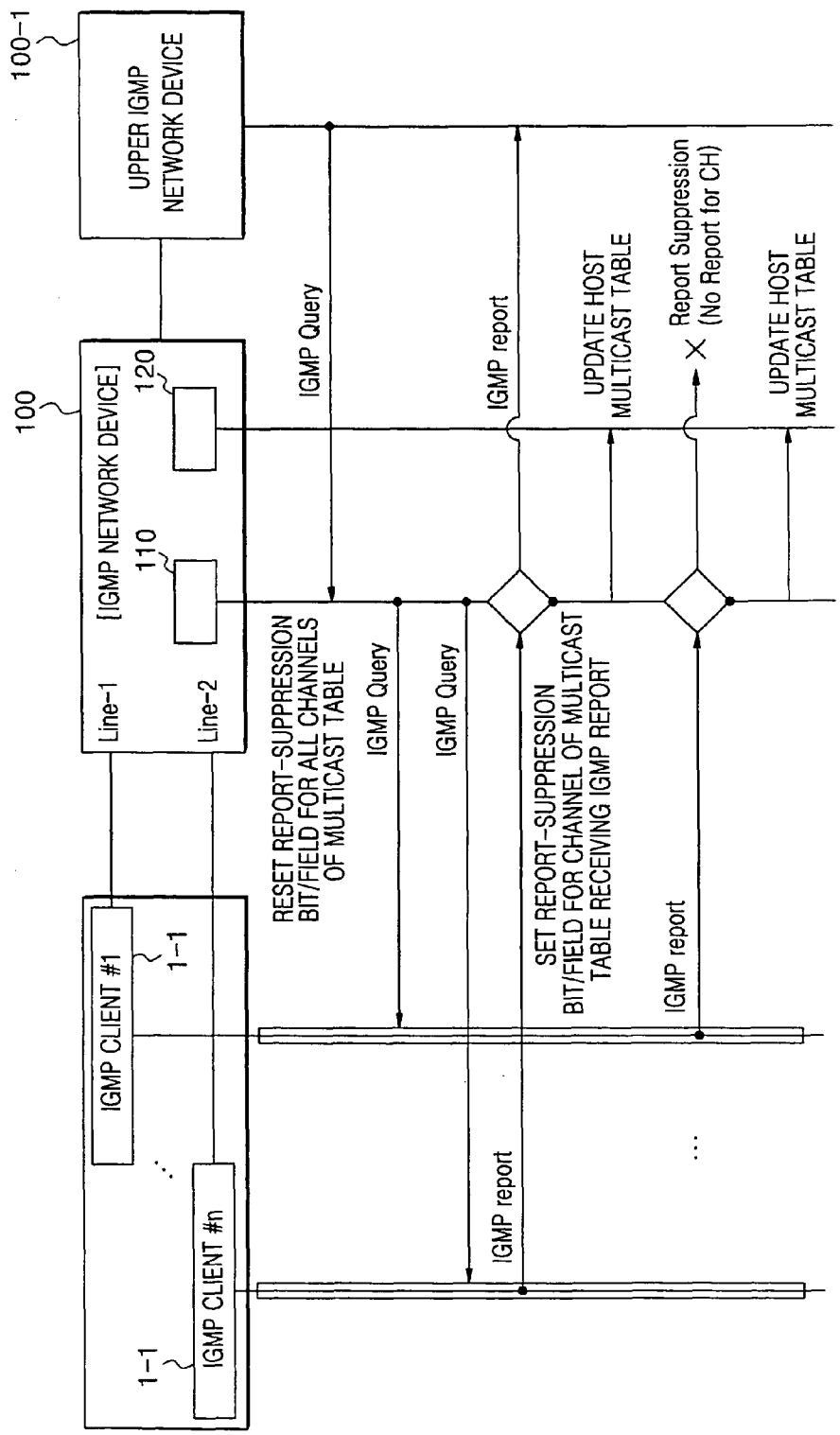
FIG. 5 is a reference view illustrating a signal flow of an IGMP network device in an IP digital broadcasting system according to a second exemplary embodiment of the present invention.

In a general function and a detailed operation of each of the constituent elements, a description for signal processing thereof will be omitted, and a description for an operation related to the present invention will be made with reference to FIG. 5.

First, an upper IGMP network device 100-1 transmits an IGMP query to a lower IGMP network device 100 which is managed by the upper IGMP network device 100-1. The IGMP query transmitted from the upper IGMP network device 100-1 to the lower IGMP network device 100 is transmitted once per two minutes. The lower IGMP network device 100 is connected to at least one IGMP client 1-1, and the upper IGMP network device 100-1 is connected to at least one lower IGMP network device 100 to be connected to the IP broadcasting station 200 over the Internet.

A network packet transmission/reception unit 110 of the lower IGMP network device 100 receiving the IGMP query from the upper IGMP network device 100-1 transmits the IGMP query to all the IGMP clients 1-1.

Upon receipt of an IGMP response report to the IGMP query from each IGMP client 1-1 for a predetermined critical time, the network packet transmission/reception unit 110 of the lower IGMP network device 100 transmits only an initial IGMP response report to the upper IGMP network device 100-1.

All the received IGMP response reports are transmitted to a host 120. When the IGMP response report is not received from the IGMP client 1-1 for a predetermined critical time, the network packet transmission/reception unit 110 of the lower IGMP network device 100 releases the IGMP client 1-1 of the non-received IGMP response report from a channel, and updates a transmission/reception unit multicast table 111 to correspond thereto.

At this time, the host 120 changes a field/bit in the transmission/reception unit multicast table 111 to determine whether or not the IGMP response report is received from each of the IGMP clients 1-1 for a predetermined critical time. In other words, upon receipt of the IGMP query from the upper IGMP network device 100-1 as in Table 7, the field/bits of the transmission/reception unit multicast table 111 are all set to "0" (zero).

TABLE 7

| Channel information | IGMP client (port) information | Field/bit |
|---|---|---|
| Ch 1 | Port 2, Port 3 | 0 |
| Ch 2 | Port 4, Port 5 | 0 |
| Ch 10 | Port 7 | 0 |
| Ch 11 | Port 1, Port 6 | 0 |

After that, upon receipt of the IGMP response report from each IGMP client 1-1, the host 120 changes the field/bit of the channel receiving the IGMP response report into "1", and setting of the transmission/reception unit multicast table 111 as shown in Table 8.

TABLE 8

| Channel information | IGMP client (port) information | Field/bit |
|---|---|---|
| Ch 1 | Port 2, Port 3 | 1 |
| Ch 2 | Port 4, Port 5 | 1 |
| Ch 10 | Port 7 | 1 |
| Ch 11 | Port 1, Port 6 | 1 |

When the IGMP response report is not received from the IGMP client 1-1 even after a lapse of a critical time, the host 120 releases the IGMP client 1-1 from which the IGMP response report is not received, from the channel.

Figure 6:
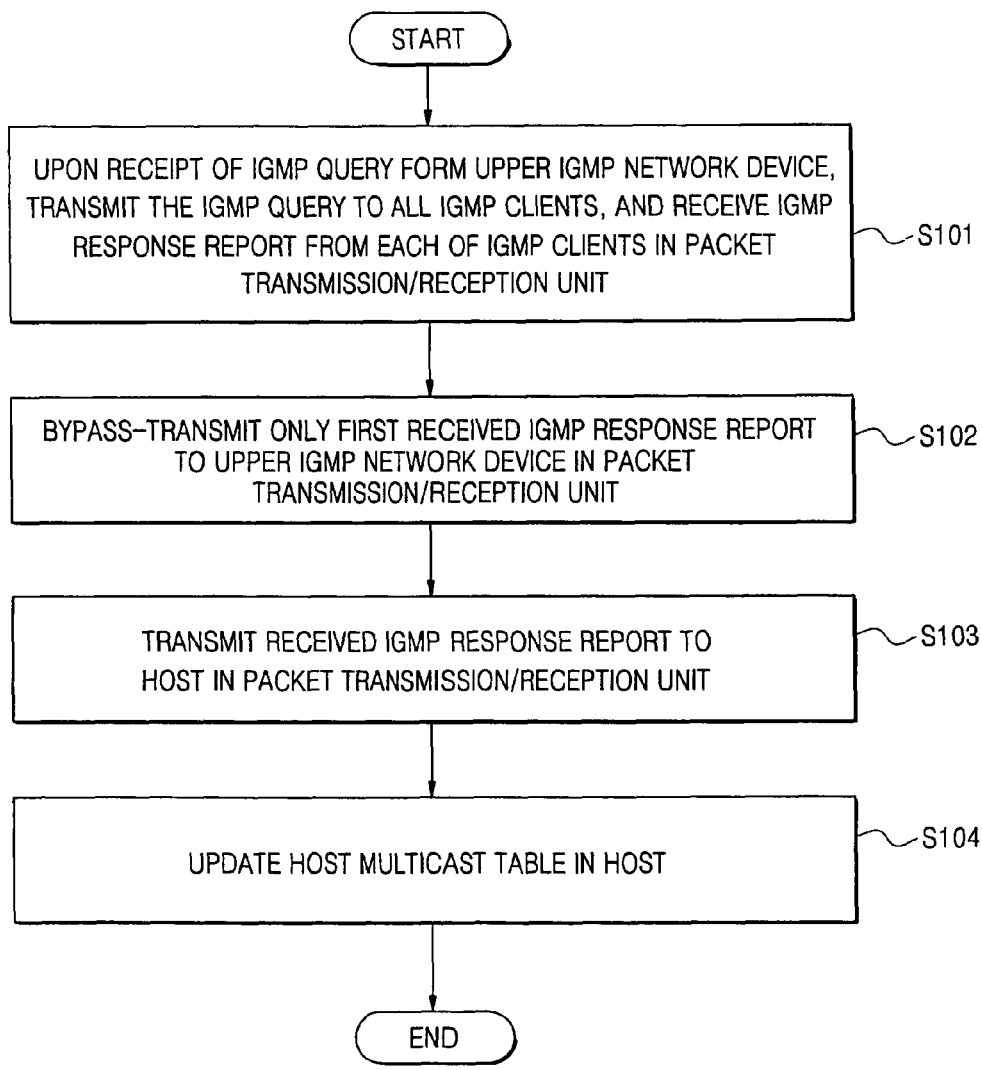
FIG. 6 is a flowchart illustrating a signal processing control method of an IGMP network device in an IP digital broadcasting system according to the second exemplary embodiment of the present invention.

A signal processing control method of the above constructed IGMP network device in the IP digital broadcasting system according to a second exemplary embodiment of the present invention will now be described with reference to FIG. 6.

First, upon receipt of the IGMP query from the upper IGMP network device 100-1, the packet transmission/reception unit 110 transmits the signal processing IGMP query to all IGMP clients 1-1, and receives the IGMP response report in response to the IGMP query from each IGMP client 1-1 (Step 101).

After that (after Step 101), the packet transmission/reception unit 110 copies only a first received IGMP response report, and transmits the copied report to the upper IGMP network device 100-1 (Step 102). Step 102 can be achieved by checking a specific field/bit for indicating whether or not the IGMP response report of the transmission/reception unit multicast table 111 is forbidden to be transmitted, at the packet transmission/reception unit 110.

Next, the packet transmission/reception unit 110 transmits the IGMP response report received from each IGMP client 1-1, to the host 120 (Step 103).

After that (after Step 103), the host 120 updates the host multicast table 121 and the transmission/reception unit multicast table 111 through the IGMP response report received from the packet transmission/reception unit 110 (Step 104). When the IGMP response report is not received from the IGMP client 1-1 for a critical time, the host 120 releases the IGMP client 1-1 registered in the host multicast table 121 and the transmission/reception unit multicast table 111.

Then, the host 120 updates the multicast table of the packet transmission/reception unit 110, if necessary.

An IGMP network device 100 in an IP digital broadcasting system according to a third exemplary embodiment of the present invention includes a packet transmission/reception unit 110 and a host 120. The packet transmission/reception unit 110 includes a transmission/reception unit multicast table 111, and the host 120 includes a host multicast table 121.

The packet transmission/reception unit 110 transmits an IGMP query generated from the host 120 to all IGMP clients 1-1, and receives an IGMP response report which is a response to the IGMP query and then transmits the received IGMP response report to the host 120. The transmission/reception unit multicast table 111 of the packet transmission/reception unit 110 includes at least one of the channel information (group IP (Internet protocol) and group MAC (media access control)) indicating a channel, information on an IGMP client (port number or permanent virtual circuit (PVC) information) currently being provided with the supplied channel, and a field/bit for determining whether or not the IGMP response report is received.

After the host 120 receives the IGMP response report from the packet transmission/reception unit 110, processes the IGMP response report, updates the host multicast table 121, and updates the transmission/reception unit multicast table 111, if necessary. When the host 120 does not receive the IGMP response report from the IGMP client 1-1 for a critical time, the host 120 releases the IGMP client 1-1 registered in the host multicast table 121 and the transmission/reception unit multicast table 111.

Further, the transmission/reception unit multicast table 111 includes at least one of channel information (group IP and group MAC) indicating a channel, information on an IGMP client (port number or permanent virtual circuit (PVC) information) currently being provided with the supplied channel, and a field/bit for determining whether or not the IGMP response report is received.

Figure 7:
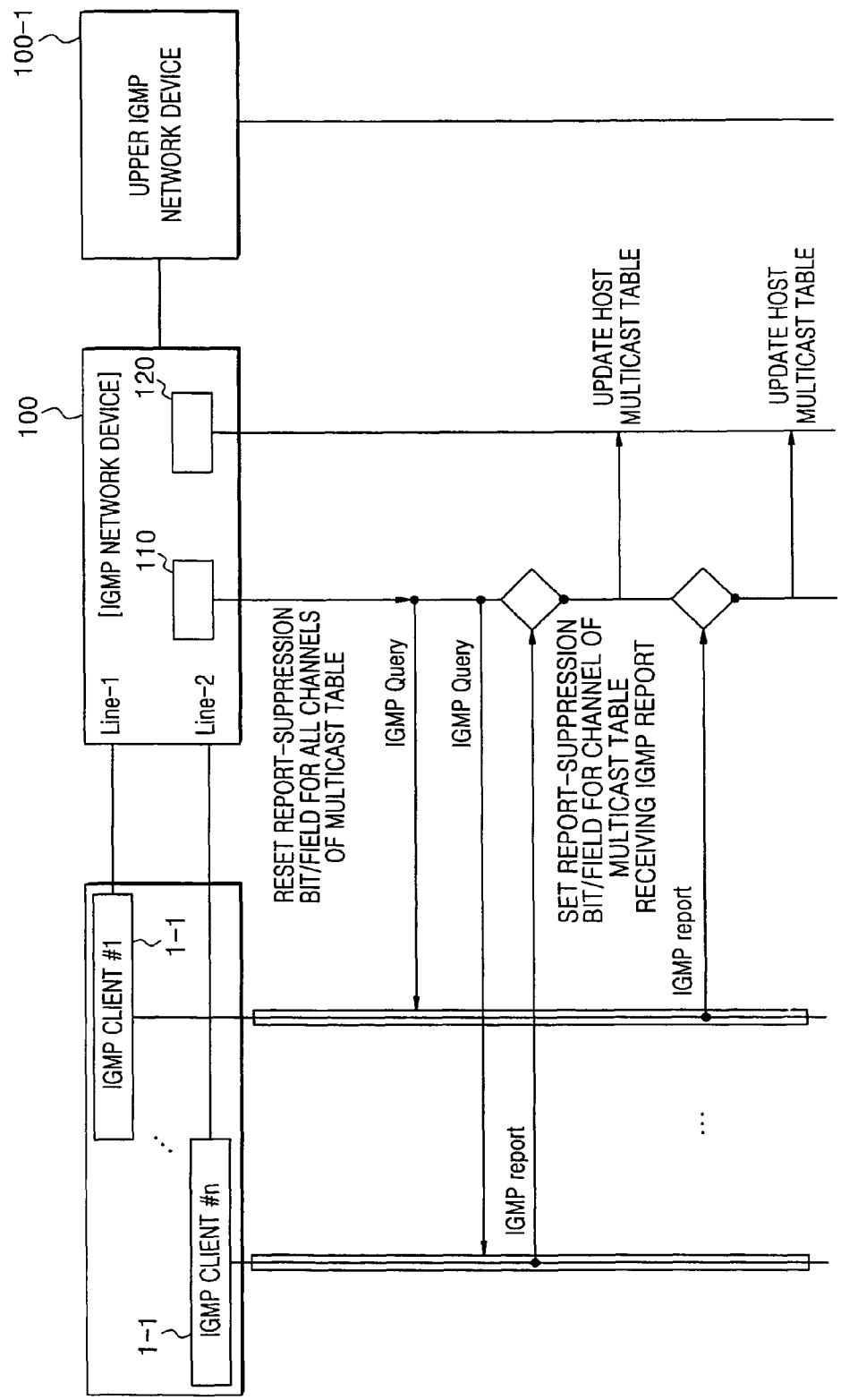
FIG. 7 is a reference view illustrating a signal flow of an IGMP network device in an IP digital broadcasting system according to a third embodiment of the present invention.

In a general function and a detailed operation of each of the constituent elements, a description for signal processing thereof will be omitted, and a description for an operation related to the present invention will be made with reference to FIG. 7.

First, the IGMP network device 100 transmits an IGMP query to all IGMP clients 1-1 which is managed by the IGMP network device 100.

After the IGMP network device 100 transmits the IGMP query to all IGMP clients 1-1, the IGMP network device 100 receives an IGMP response report to the IGMP query from each IGMP client 1-1 for a predetermined critical time. The packet transmission/reception unit 110 of the IGMP network device 100 transmits all IGMP response reports received from the IGMP client 1-1 to the host 120. When the packet transmission/reception unit 110 does not receive the IGMP response report from the IGMP client 1-1 for a predetermined critical time, it releases the channel of its signal processing IGMP client 1-1, and updates the transmission/reception unit multicast table 111 to correspond thereto.

The host 120 changes the field/bit in the host multicast table 121 to determine that the IGMP response report is received from each IGMP client 1-1 for a predetermined critical time. In other words, upon receipt of the IGMP query from the upper IGMP network device 100-1 as shown in Table 7, the field/bit of the host multicast table 121 is all set to "0".

After that, upon receipt of the IGMP response report from each IGMP client 1-1, the host 120 sets the field/bit of the channel receiving the IGMP response report, to "1" as shown in Table 8.

When the IGMP response report is not received from the IGMP client 1-1 even after a lapse of the critical time, the host 120 releases the channel of its signal processing IGMP client 1-1.

Figure 8:
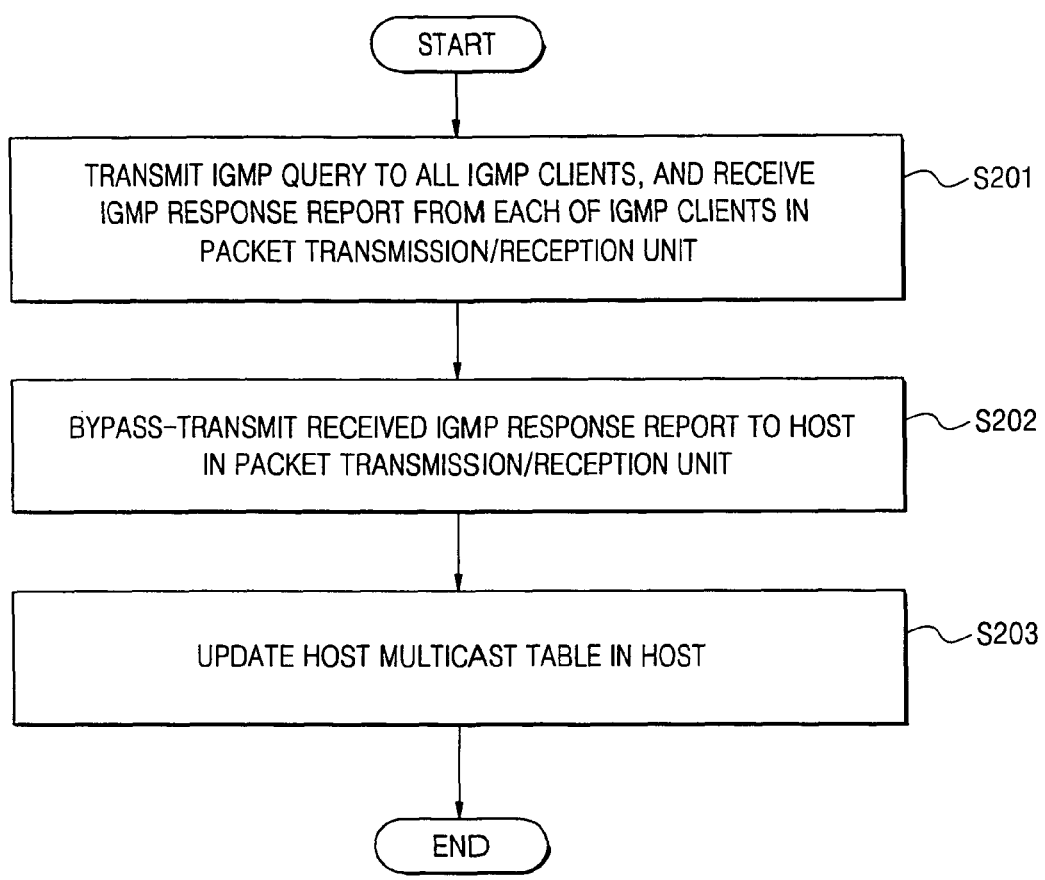
FIG. 8 is a flowchart illustrating a signal processing control method of an IGMP network device in an IP digital broadcasting system according to the third embodiment of the present invention.

Then, a signal processing control method of the IGMP network device in the IP digital broadcasting system according to the present invention will now be described with reference to FIG. 8.

First, the packet transmission/reception unit 110 transmits an IGMP query to all IGMP clients 1-1, respectively, and receives an IGMP response report as a response to the IGMP query from each IGMP client 1-1 (Step 201). The step (Step 201) of copying only a first received IGMP response report and bypass-transmitting it to an upper IGMP network device 100-1 in the packet transmission/reception unit 110 can be achieved by checking a specific field/bit for indicating whether or not the IGMP response report of the transmission/ reception unit multicast table 111 is forbidden (or without permission) to be transmitted, at the packet transmission/reception unit 110.

After that (after Step 201), the packet transmission/reception unit 110 transmits the IGMP response report received from each IGMP client 1-1 to the host 120 (Step 202).

Next, the host 120 updates the host multicast table 121 and the transmission/reception unit multicast table 111 through the IGMP response report received from the packet transmission/reception unit 110 (Step 203). Here, when the IGMP response report is not received from the IGMP client 1-1 for a critical time, the host 120 releases the IGMP client 1-1 registered in both the host multicast table 121 and the transmission/reception unit multicast table 111.

The host 120 updates the multicast table of the packet transmission/reception unit 110, if necessary.

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

An example of a computer, but not limited to this example of the computer, that can read computer readable media that includes computer-executable instructions of the present invention includes a processor that controls the computer. The processor uses the system memory and a computer readable memory device that includes certain computer readable recording media. A system bus connects the processor to a network interface, modem or other interface that accommodates a connection to another computer or network such as the Internet. The system bus may also include an input and output interface that accommodates connection to a variety of other devices.

As described above, in an IGMP network device and a signal processing control method thereof in an IP digital broadcasting system of the present invention, a packet transmission/reception unit of the IGMP network device refers to its multicast table and transmits an IGMP packet received from an IGMP client to an upper IGMP network device prior to processing by the host, so that it is possible to reduce delay and load generated when the host again generates the IGMP packet and transmits it to the upper IGMP network device after processing all IGMP packets.

In addition, the present invention enables the IGMP client to receive a faster response upon change of the channel.

Further, in an IGMP network device and a signal processing control method thereof in an IP digital broadcasting system of the present invention, when at least one client is connected to each channel, the channel can be continuously maintained to transmit a query response to the channel only in one client and transmit a subsequent response to the host, thereby reducing load on the network.

In accordance with the above description, numerous Internet Group Management Protocols may be used. The IGMPs may include, for example, IGMPs described in memoranda published by the Internet Engineering Task Force (IETF) such as IETF's Request for Comments (RFC). More particularly, the IGMPs may include RFC 2236 ("Internet Group Management Protocol, Version 2"), RFC 2933 ("Internet Group Management Protocol MIB"), RFC 3228 ("IANA Considerations for IPv4 Internet Group Management Protocol (IGMP)"), RFC 3376 ("Internet Group Management Protocol, Version 3"), RFC 4541 ("Considerations for Internet Group Management Protocol (IGMP) and Multicast Listener Discovery (MLD) Snooping Switches"), RFC 4604 ("Using Internet Group Management Protocol Version 3 (IGMPv3) and Multicast Listener Discovery Protocol Version 2 (MLDv2) for Source-Specific Multicast"), and RFC 4605 ("Internet Group Management Protocol (IGMP)/Multicast Listener Discovery (MLD)-Based Multicast Forwarding ('IGMP/MLD Proxying')").

While the present invention has been described with reference to exemplary embodiments thereof, it will be understood by those skilled in the art that various changes in from and detail may be made therein without departing from the scope of the present invention as defined by the following claims.

What is claimed is:

1. A signal processing control method of an Internet group membership protocol network device in an Internet protocol digital broadcasting system, the method comprising:

when an Internet group membership protocol packet is received from an Internet group membership protocol client at a packet transmission and reception unit included in the Internet group membership protocol network device which comprises the packet transmission and reception unit for transmitting and receiving data packets and a host for processing data packets, determining, at the packet transmission and reception unit, whether or not said received Internet group membership protocol packet is to be transmitted to an upper Internet group membership protocol network device via bypass without passing through the host;

when it is determined that said Internet group membership protocol packet received from said Internet group membership protocol client is to be transmitted via bypass, copying, at said packet transmission/reception unit, said received Internet group membership protocol packet, and transmitting the original Internet group membership protocol packet received from the Internet group membership protocol client to the upper Internet group membership protocol network device without passing through the host;

transmitting, at said packet transmission and reception unit, the copied Internet group membership protocol packet to the host; and receiving, at said host, said Internet group membership protocol packet transmitted from said packet transmission and reception unit, processing said Internet group membership protocol packet, and simultaneously updating a multicast table of said host and a multicast table of said packet transmission and reception unit.

2. The method of claim 1, further comprising:

when it is determined that said Internet group membership protocol packet received from said Internet group membership protocol client is not to be transmitted via bypass, transmitting, at said packet transmission and reception unit, said Internet group membership protocol packet received from said Internet group membership protocol client to said host; and receiving, at said host, said Internet group membership protocol packet from said packet transmission and reception unit, processing said Internet group membership protocol packet, updating the multicast table of said host, and, if necessary, updating said multicast table of said packet transmission and reception unit.

3. The method of claim 2, wherein determining whether or not said received Internet group membership protocol packet is to be transmitted via bypass at said packet transmission and reception unit comprises:

determining, at said packet transmission and reception unit, whether or not said Internet group membership protocol packet received from said Internet group membership protocol client is an Internet group membership protocol report message for a channel request;

when it is determined that said Internet group membership protocol packet received from said Internet group membership protocol client is said Internet group membership protocol report message, checking, at said packet transmission and reception unit, said multicast table of said packet transmission and reception unit, and determining whether or not a channel requested for registration through said Internet group membership protocol report message is registered in said multicast table; and when it is determined that said channel requested for registration through said Internet group membership protocol report message is not registered in said multicast table, transmitting, at said packet transmission and reception unit, said received Internet group membership protocol packet to the upper Internet group membership protocol network device via bypass.

4. The method of claim 3, further comprising, when it is determined that the channel requested for registration through said Internet group membership protocol report message is registered in said multicast table, determining, at said packet transmission and reception unit, not to transmit said received Internet group membership protocol packet via bypass.

5. The method of claim 3, further comprising:

when it is determined that said Internet group membership protocol packet received from said Internet group membership protocol client is an Internet group membership protocol leave message, checking, at said packet transmission and reception unit, said multicast table of said packet transmission and reception unit, and determining whether or not a channel requested for release through said Internet group membership protocol leave message is registered in said multicast table;

when it is determined that said channel requested for release through said Internet group membership protocol leave message is registered in said multicast table, determining, at said packet transmission and reception unit, whether or not there are other Internet group membership protocol clients registered on said channel requested for release; and when it is determined that there are not other Internet group membership protocol clients registered on said channel requested for release, transmitting, at said packet transmission and reception unit, said received Internet group membership protocol packet to the upper Internet group membership protocol network device via bypass.

6. The method of claim 5, further comprising, when it is determined that there are other Internet group membership protocol clients registered on said channel requested for release, determining, at said packet transmission and reception unit, not to transmit said received Internet group membership protocol packet via bypass.

7. An Internet group membership protocol network device in an Internet protocol (IP) digital broadcasting system, the Internet group membership protocol network device comprising:

a packet transmission and reception unit for transmitting and receiving data packets; and a host for processing data packets, upon receipt of an Internet group membership protocol packet from an Internet group membership protocol client at the packet transmission and reception unit of the Internet group membership protocol network device, said packet transmission and reception unit determining whether or not said Internet group membership protocol packet is to be transmitted to an upper Internet group membership protocol network device without passing through the host via bypass, when it is determined that said Internet group membership protocol packet is to be transmitted via bypass, said packet transmission and reception unit copying said received Internet group membership protocol packet, transmitting the originally received Internet group membership protocol packet to an upper Internet group membership protocol network device without passing through the host, and transmitting said copied Internet group membership protocol packet to the host, when it is determined that said Internet group membership protocol packet is not to be transmitted via bypass, said packet transmission and reception unit transmitting the originally received Internet group membership protocol packet to said host, and said host receiving the Internet group membership protocol packet from said packet transmission and reception unit, processing said Internet group membership protocol packet, updating a multicast table of said host, and, if necessary, updating a multicast table of said packet transmission and reception unit.

8. The device of claim 7, wherein the packet transmission and reception unit further comprises said multicast table comprising channel information comprising a group Internet protocol and a group media access control, and Internet group membership protocol client information.

9. The device of claim 8, wherein, when said Internet group membership protocol packet received from said Internet group membership protocol client is an Internet group membership protocol report message for channel registration, only when said channel requested through said Internet group membership protocol report message is not registered in the multicast table of the packet transmission and reception unit, said packet transmission and reception unit determines to transmit said Internet group membership protocol packet via bypass.

10. The device of claim 8, wherein, when said Internet group membership protocol packet received from said Internet group membership protocol client is an Internet group membership protocol leave message for releasing a channel, in a case where only said Internet group membership protocol client is registered corresponding to a channel requested to be released in the multicast table of said packet transmission and reception unit, said packet transmission and reception unit determines to transmit said Internet group membership protocol packet via bypass.

11. A signal processing control method of an Internet group membership protocol network device in an Internet protocol digital broadcasting system, the method comprising:

when an Internet group membership protocol query is received from an upper Internet group membership protocol network device at a packet transmission and reception unit included in the Internet group membership protocol network device which comprises the packet transmission and reception unit for transmitting and receiving data packets and a host for processing data packets, transmitting, at the packet transmission and reception unit, said signal processing Internet group membership protocol query to all Internet group membership protocol clients, respectively, and receiving, at the packet transmission and reception unit, an Internet group membership protocol response report from each of said Internet group membership protocol clients as a response to said Internet group membership protocol query;

bypass-transmitting, at said packet transmission and reception unit, only a first received Internet group membership protocol response report to said upper Internet group membership protocol network device without passing through the host;

transmitting, at said packet transmission and reception unit, said Internet group membership protocol response report received from each of said Internet group membership protocol clients to said host; and updating, at said host, a multicast table of said host and a multicast table of the packet transmission and reception unit in dependence upon said Internet group membership protocol response report received from said packet transmission and reception unit.

12. The method of claim 11, wherein, in the step of bypass-transmitting, at said packet transmission and reception unit, only said first received Internet group membership protocol response report to said upper Internet group membership protocol network device, said packet transmission and reception unit checks a specific field or bit of said multicast table of the packet transmission and reception unit for indicating whether or not said Internet group membership protocol response report is forbidden to be transmitted, and determines whether or not said bypass-transmission to said upper Internet group membership protocol network device is to be performed.

13. The method of claim 12, wherein, in the step of bypass-transmitting, at said packet transmission and reception unit, only said first received Internet group membership protocol response report to said upper Internet group membership protocol network device, when said specific field or bit of said multicast table of the packet transmission and reception unit is not set, said packet transmission and reception unit transmits said first received Internet group membership protocol response report to said upper Internet group membership protocol network device.

14. The method of claim 12, wherein, in the step of bypass-transmitting, at said packet transmission and reception unit, only said first received Internet group membership protocol response report to said upper Internet group membership protocol network device, when said specific field or bit of said multicast table of the packet transmission and reception unit is set, said packet transmission and reception unit transmits said Internet group membership protocol response report to said host without bypass-transmitting it to said upper Internet group membership protocol network device.

15. The method of claim 12, wherein, in the step of updating, at said host, said multicast table of said host through said Internet group membership protocol response report received from said packet transmission and reception unit, when said Internet group membership protocol response report is not received from said Internet group membership protocol client for a critical time, said host releases said Internet group membership protocol client registered in said multicast table of said host and said multicast table of said packet transmission and reception unit.

16. An Internet group membership protocol network device in an Internet protocol digital broadcasting system, the Internet group membership protocol network device comprising:

a packet transmission and reception unit for transmitting and receiving data packets; and a host for processing data packets, when an Internet group membership protocol response report which is a response to an Internet group membership protocol query received from an upper Internet group membership protocol network device is received from an Internet group membership protocol client at the packet transmission and reception unit of the Internet group membership protocol network device, the packet transmission and reception unit bypass-transmitting only a first received Internet group membership protocol response report to said upper Internet group membership protocol network device without passing through the host, and transmitting said received Internet group membership protocol response report to the host, and said host receiving said Internet group membership protocol response report from said packet transmission and reception unit, processing said Internet group membership protocol response report, and updating a multicast table of said host and a multicast table of the packet transmission and reception unit.

17. The device of claim 16, wherein said packet transmission and reception unit comprises said multicast table comprising at least one of channel information of group Internet protocol and group media access control, Internet group membership protocol client information of port number or permanent virtual circuit information, and a field or bit for determining whether or not said Internet group membership protocol response report is received.

18. The device of claim 17, wherein, when said Internet group membership protocol response report is not received from said Internet group membership protocol client for a critical time, said host releases said Internet group membership protocol client registered in said multicast table of said host and said multicast table of said packet transmission and reception unit.

19. The method of claim 11, further comprising:

transmitting, at said packet transmission and reception unit, an Internet group membership protocol query generated from said host to all Internet group membership protocol clients, and receiving an Internet group membership protocol response report as a response to said Internet group membership protocol query from at least one of said Internet group membership protocol clients;

transmitting, at said packet transmission and reception unit, said Internet group membership protocol response report received from each of said Internet group membership protocol clients to said host; and updating, at said host, said multicast table of said host through said Internet group membership protocol response report received from said packet transmission and reception unit.

20. The device of claim 16, wherein said packet transmission and reception unit is a device of a network layer that is a second layer for transmitting and receiving said packet.

* * * * *